(12) United States Patent
Hirano

(10) Patent No.: US 11,198,366 B2
(45) Date of Patent: Dec. 14, 2021

(54) SOLAR POWER GENERATION SYSTEM

(71) Applicant: TOYOTA JIDOSHA KABUSHIKI KAISHA, Toyota (JP)

(72) Inventor: Takahiro Hirano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 16/145,709

(22) Filed: Sep. 28, 2018

(65) Prior Publication Data

US 2019/0143835 A1 May 16, 2019

(30) Foreign Application Priority Data

Nov. 15, 2017 (JP) .............................. JP2017-220064

(51) Int. Cl.
*B60L 8/00* (2006.01)
*B60L 58/12* (2019.01)
*B60R 16/033* (2006.01)
*H02J 7/35* (2006.01)
*H02J 7/34* (2006.01)
*H02J 3/38* (2006.01)
*H02S 40/38* (2014.01)
*H01M 10/052* (2010.01)
*H02S 10/40* (2014.01)

(52) U.S. Cl.
CPC .............. *B60L 8/003* (2013.01); *B60L 58/12* (2019.02); *B60R 16/033* (2013.01); *H02J 7/342* (2020.01); *H02J 7/35* (2013.01); *H01M 10/052* (2013.01); *H02J 3/385* (2013.01); *H02S 10/40* (2014.12); *H02S 40/38* (2014.12)

(58) Field of Classification Search
CPC ........ B60L 58/21; B60L 8/0307; B60L 8/003; B60L 58/12–15; H02S 10/40; H02J 7/342; H02J 7/35; H02J 3/385; H02J 7/14–1492; B60R 16/0307; B60R 16/033; H01M 10/052
See application file for complete search history.

(56) References Cited

U.S. PATENT DOCUMENTS 9,790,909 B2 * 10/2017 Jang ...................... B60W 10/08
2010/0134065 A1 * 6/2010 Iida .......................... B60L 3/12
320/103

(Continued)

FOREIGN PATENT DOCUMENTS

JP 2012-515526 A 7/2012
JP 2014-018019 A 1/2014

(Continued)

*Primary Examiner* — Hal Kaplan
*Assistant Examiner* — David A Shiao
(74) *Attorney, Agent, or Firm* — Oliff PLC

(57) ABSTRACT

A solar power generation system of a vehicle includes a solar panel configured to generate power by sunlight, a first load, an auxiliary battery configured to supply the power to the first load, a second load configured to drive the vehicle, a driving battery configured to supply power needed to drive the vehicle to the second load, a first power converter configured to supply the power generated by the solar panel to the auxiliary battery, and a second power converter configured to bidirectionally exchange the power between the auxiliary battery and the driving battery.

5 Claims, 3 Drawing Sheets

(56) References Cited

U.S. PATENT DOCUMENTS

| | | | |
|---|---|---|---|
| 2010/0244782 A1* | 9/2010 | Nagayama | H01M 10/44 320/162 |
| 2011/0187184 A1* | 8/2011 | Ichikawa | B60L 1/003 307/10.1 |
| 2012/0133322 A1* | 5/2012 | Walsh | H01L 31/048 320/101 |
| 2013/0054069 A1* | 2/2013 | Komiya | B60L 8/003 701/22 |
| 2013/0300340 A1* | 11/2013 | Videtich | H01M 10/48 320/101 |
| 2013/0342154 A1 | 12/2013 | Yamamoto | |
| 2014/0159478 A1* | 6/2014 | Ang | B60L 1/00 307/9.1 |
| 2015/0280487 A1* | 10/2015 | Nakazawa | B60K 16/00 320/101 |
| 2015/0291052 A1* | 10/2015 | Nakazawa | B60R 16/03 320/101 |
| 2015/0303739 A1* | 10/2015 | Shibata | B60R 16/03 290/38 C |
| 2015/0336468 A1 | 11/2015 | Sugiyama | |
| 2015/0349582 A1* | 12/2015 | Maeno | B60L 3/0046 320/101 |
| 2017/0166079 A1* | 6/2017 | Saucke | B60L 58/22 |
| 2017/0267113 A1* | 9/2017 | Harada | B60L 3/0084 |
| 2018/0041048 A1* | 2/2018 | Yang | F02D 41/065 |
| 2019/0296575 A1* | 9/2019 | Yang | H02J 7/35 |

FOREIGN PATENT DOCUMENTS

| | | |
|---|---|---|
| JP | 2014-174876 A | 9/2014 |
| JP | 5582173 B2 | 9/2014 |
| WO | 2010/083435 A1 | 7/2010 |

* cited by examiner

SOLAR POWER GENERATION SYSTEM

INCORPORATION BY REFERENCE

The disclosure of Japanese Patent Application No. 2017-220064 filed on Nov. 15, 2017 including the specification, drawings and abstract is incorporated herein by reference in its entirety.

BACKGROUND

1. Technical Field

The present disclosure relates to a solar power generation system mounted on a vehicle.

2. Description of Related Art

For example, Japanese Unexamined Patent Application Publication No. 2014-174876 (JP 2014-174876 A) and Japanese Patent No. 5582173 (JP 5582173 B) disclose solar power generation systems that use power generated by solar panels (photovoltaic power generation devices).

SUMMARY

The solar power generation systems disclosed in JP 2014-174876 A and JP 5582173 B include a lot of dedicated components for solar power generation. For example, the solar power generation system disclosed in JP 2014-174876 A includes a secondary battery dedicated for solar power generation that temporarily stores generated power, a power converter that supplies the generated power to the secondary battery dedicated for solar power generation, a power converter that controls the power supply from the secondary battery dedicated for solar power generation to an auxiliary battery, a power converter that controls the power supply from the secondary battery dedicated for solar power generation to a driving battery, and the like.

Since a lot of dedicated components are included as described above, the solar power generation systems in the related arts are high cost and high weight.

The present disclosure provides a low cost and low weight solar power generation system having fewer dedicated components for the solar power generation.

An aspect of the present disclosure relates to a solar power generation system of a vehicle including a solar panel, a first load, an auxiliary battery, a second load, a driving battery, a first power converter, and a second power converter. The solar panel is configured to generate power by sunlight. The auxiliary battery is configured to supply the power to the first load. The second load is configured to drive the vehicle. The driving battery is configured to supply power needed to drive the vehicle to the second load. The first power converter is configured to supply the power generated by the solar panel to the auxiliary battery. The second power converter is configured to bidirectionally exchange the power between the auxiliary battery and the driving battery.

According to the aspect of the present disclosure, the power generated by the solar panel is not temporarily stored in a secondary battery dedicated for solar power generation but is directly supplied to the auxiliary battery such as a lithium cell. According to the aspect of the present disclosure, the second power converter provided between the auxiliary battery and the driving battery is configured to bidirectionally exchange the power. With the above configuration, the secondary battery dedicated for solar power generation and a power converter dedicated for solar power generation that controls power supply from the secondary battery dedicated for solar power generation to the auxiliary battery, and a power converter dedicated for solar power generation that controls the power supply from the secondary battery dedicated for solar power generation to the driving battery can be removed from the solar power generation system.

In the solar power generation system according to the aspect, the vehicle may be configured to switch between a first control state where the vehicle travels by an accelerator operation and a second control state where the traveling of the vehicle by the accelerator operation is restricted. When the vehicle is in the first control state, the second power converter may be configured to supply the power of the driving battery to the auxiliary battery in a case where a power storage amount of the auxiliary battery is equal to or less than a predetermined upper limit value, and supply the power of the auxiliary battery to the driving battery in a case where the power storage amount of the auxiliary battery exceeds the upper limit value. With the above supply method, the power of the auxiliary battery and the power of the driving battery can be effectively utilized.

In the solar power generation system according to the aspect, when the vehicle is in the second control state, the second power converter may be configured to supply the power of the auxiliary battery to the driving battery until the power storage amount of the auxiliary battery decreases to a predetermined lower limit value which is smaller than a predetermined threshold value in a case where the power storage amount of the auxiliary battery exceeds the threshold value. With the above supply method, the power of the auxiliary battery can be effectively utilized.

In the solar power generation system according to the aspect, the vehicle may be configured to switch between the first control state where the vehicle travels by the accelerator operation and the second control state where the traveling of the vehicle by the accelerator operation is restricted. When the vehicle is in the second control state, the second power converter may be configured to supply the power of the auxiliary battery to the driving battery until the power storage amount of the auxiliary battery decreases to a predetermined lower limit value which is smaller than a predetermined threshold value in a case where the power storage amount of the auxiliary battery exceeds the threshold value.

In the solar power generation system according to the aspect, the auxiliary battery may be a lithium cell.

According to the aspect of the present disclosure, it is possible to realize a low cost and low weight solar power generation system by reducing dedicated components for solar power generation.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Overview

A solar power generation system according to an embodiment has a configuration wherein power generated by a solar panel is directly supplied to an auxiliary battery. With the configuration, there is no need to include a secondary battery dedicated for solar power generation and a power converter dedicated for solar power generation that controls power supply from the secondary battery dedicated for solar power generation to the auxiliary battery. The solar power generation system according to the embodiment is configured to be able to bidirectionally exchange the power between the auxiliary battery and a driving battery. With the configuration, there is no need to include a power converter dedicated for solar power generation that controls power supply from the secondary battery dedicated for solar power generation to the driving battery. Accordingly, the low cost and low weight of the solar power generation system can be achieved.

Configuration of Solar Power Generation System

Figure 1:
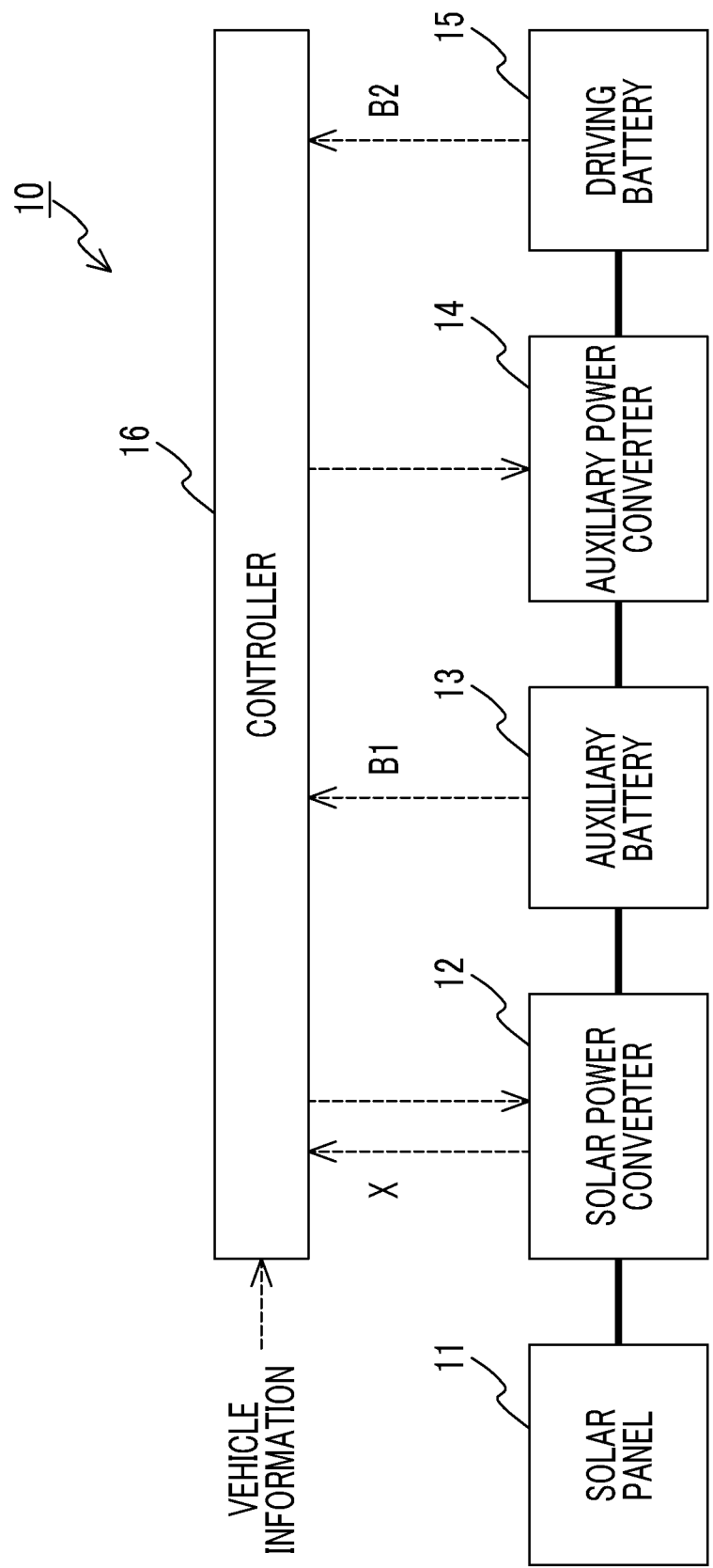
FIG. 1 is a diagram showing a configuration example of a solar power generation system according to one embodiment of the present disclosure.

FIG. 1 is a diagram showing a configuration example of a solar power generation system 10 according to one embodiment of the present disclosure. The solar power generation system 10 according to the embodiment exemplified in FIG. 1 includes a solar panel 11, a solar power converter 12, an auxiliary battery 13, an auxiliary power converter 14, a driving battery 15, and a controller 16. In FIG. 1, wires through which power signals flow are indicated by solid lines, and wires through which control signals and the like flow are indicated by broken lines.

The solar panel 11 is a solar cell module that receives irradiation of sunlight and generates the power. The power generated by the solar panel 11 (hereinafter, referred to as "generated power X") is output to the solar power converter 12. The solar panel 11 can be provided, for example, on a roof of a vehicle.

The auxiliary battery 13 is a power storing element configured to be chargeable and dischargeable, for example, a lithium cell or a nickel-hydrogen cell. The auxiliary battery 13 is connected to the solar power converter 12 so as to be chargeable by the power supplied from the solar power converter 12 and is connected to the auxiliary power converter 14 so as to be chargeable and dischargeable with the auxiliary power converter 14. The auxiliary battery 13 is connected to a first load (not shown) and supplies power needed to operate the first load. A predetermined low voltage battery is used for the auxiliary battery 13.

The driving battery 15 is a power storing element configured to be chargeable and dischargeable, for example, the lithium cell or the nickel-hydrogen cell. The driving battery 15 is connected to the auxiliary power converter 14 so as to be chargeable and dischargeable with the auxiliary power converter 14. The driving battery 15 is connected to a second load (not shown) needed for driving the vehicle and supplies power needed to operate the second load. A predetermined high voltage battery having a voltage higher than the auxiliary battery 13 is used for the driving battery 15.

The solar power converter 12 is provided between the solar panel 11 and the auxiliary battery 13 and is configured to convert the generated power X of the solar panel 11 into predetermined power based on an instruction of the controller 16 to supply the converted power to the auxiliary battery 13. The solar power converter 12 includes, for example, a DCDC converter. The solar power converter 12 can set an operating point of the solar panel 11 using a known maximum power point tracking (MPPT) control method. The solar power converter 12 corresponds to "first power converter" according to claim 1.

The auxiliary power converter 14 is provided between the auxiliary battery 13 and the driving battery 15 and is configured to be able to bidirectionally exchange the power between the batteries described above based on the instruction of the controller 16. Specifically, the auxiliary power converter 14 can be a bidirectional converter having both a step-up function of stepping up a voltage of the auxiliary battery 13 and outputting the voltage to the driving battery 15, and a step-down function of stepping down a voltage of the driving battery 15 and outputting the voltage to the auxiliary battery 13. The auxiliary power converter 14 corresponds to "second power converter" according to claims.

The controller 16 respectively acquires the generated power X of the solar panel 11, a power storage amount B1 of the auxiliary battery 13, and a power storage amount B2 of the driving battery 15. The controller 16 acquires vehicle information including a power source state (whether the state is Ready-ON state) of the vehicle from an on-vehicle device (not shown). The controller 16 respectively controls the solar power converter 12 and the auxiliary power converter 14 based on the acquired generated power X, power storage amount B1, power storage amount B2, and vehicle information.

All or some of the solar power converter 12, the auxiliary power converter 14, and the controller 16 described above are typically configured as an electronic control unit (ECU) including a central processing unit (CPU), a memory, and an input and output interface. In the electronic control unit, a program stored in the memory is read and executed by the CPU to realize the predetermined functions described above.

Control Executed by Solar Power Generation System

Next, control executed by a solar power generation system 10 according to the one embodiment will be described with reference further to FIGS. 2 and 3. A process shown in FIG. 2 and a process shown in FIG. 3 are basically executed independently.

Figure 2:
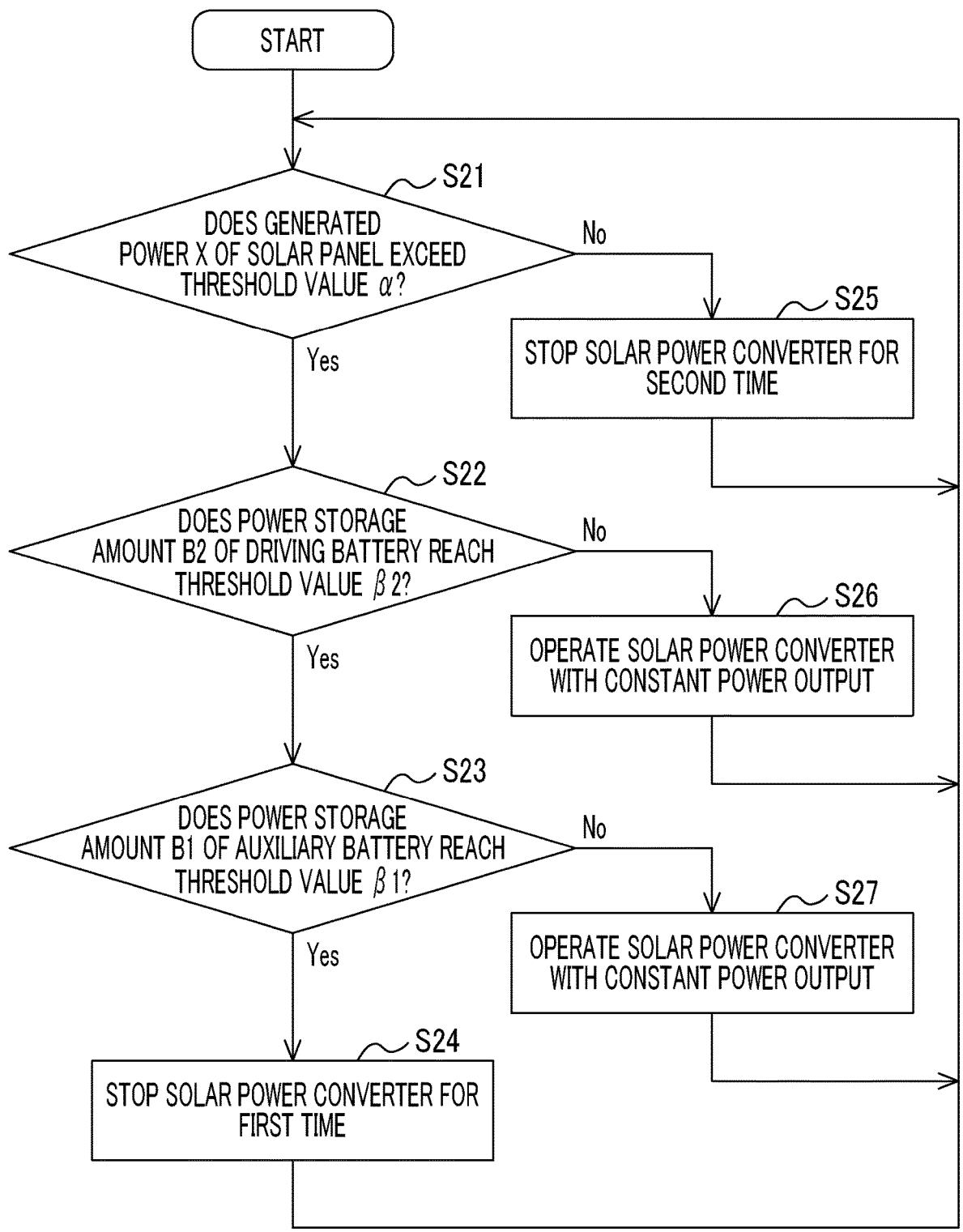
FIG. 2 is a control flowchart implemented in the solar power generation system.
Figure 3:
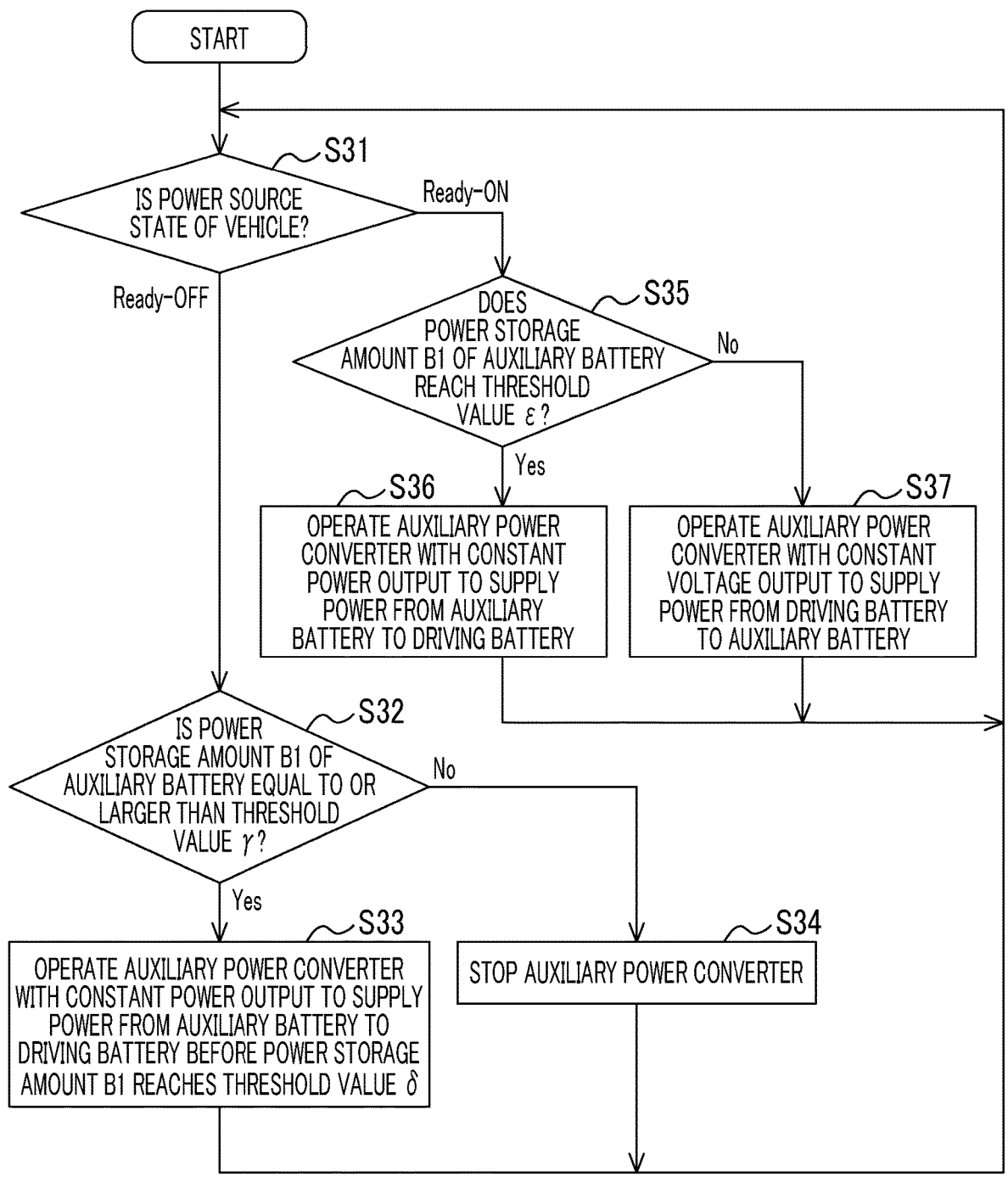
FIG. 3 is a control flowchart implemented in the solar power generation system.

FIG. 2 will be described. FIG. 2 is a flowchart showing a process procedure of control executed by the controller 16 to the solar power converter 12.

Step S21: Determination is made whether the generated power X of the solar panel 11 exceeds a predetermined threshold value $\alpha$. The threshold value $\alpha$ is a power value for determining whether processing the power generated by the solar panel 11 is appropriate. For example, when the generated power X of the solar panel 11 is lower than power needed to operate the solar power converter 12, there is no meaning of operating the solar power converter 12. Accordingly, the threshold value $\alpha$ can be set to a power value needed to operate the solar power converter 12. When the generated power X exceeds the threshold value $\alpha$, determination is made that the process of the generated power X is appropriate and the process proceeds to step S22. On the other hand, when the generated power X does not exceed the threshold value $\alpha$, determination is made that the process of the generated power X is inappropriate and the process proceeds to step S25.

Step S22: Determination is made whether the power storage amount B2 of the driving battery 15 exceeds a predetermined threshold value $\beta 2$. For example, the threshold value $\beta 2$ can be set to an upper limit power storage amount so that there is no need to further charge the driving battery 15. When the power storage amount B2 exceeds the threshold value β2, determination is made that there is no supply destination of the generated power X and the process proceeds to step S23. On the other hand, when the power storage amount B2 does not exceed the threshold value β2, determination is made that there is a supply destination of the generated power X and the process proceeds to step S26.

Step S23: Determination is made whether the power storage amount B1 of the auxiliary battery 13 exceeds a predetermined threshold value β1. For example, the threshold value β1 can be set to an upper limit power storage amount so that there is no need to further charge the auxiliary battery 13. When the power storage amount B1 exceeds the threshold value β1, determination is made that there is no supply destination of the generated power X and the process proceeds to step S24. On the other hand, when the power storage amount B1 does not exceed the threshold value β1, determination is made that there is a supply destination of the generated power X and the process proceeds to step S27.

Step S24: The solar power converter 12 is stopped for a first time set in advance. While the solar power converter 12 is stopped, the generated power X of the solar panel 11 is not processed and is discarded. The first time can be set randomly. When the first time elapses, the process returns to step S21.

Step S25: The solar power converter 12 is stopped for a second time set in advance. While the solar power converter 12 is stopped, the generated power X of the solar panel 11 is not processed and is discarded. The second time can be set randomly and may be the same as or different from the first time. When the second time elapses, the process returns to step S21.

Step S26: The solar power converter 12 is operated with constant power output. According to the above description, the generated power X of the solar panel 11 is supplied to the auxiliary battery 13 and further supplied to the driving battery 15 through the auxiliary battery 13. The solar power converter 12 can control the power generated by the solar panel 11 using, for example, a maximum power point tracking (MPPT) method.

Step S27: The solar power converter 12 is operated with the constant power output. According to the above description, the generated power X of the solar panel 11 is supplied to the auxiliary battery 13. The solar power converter 12 can control the power generated by the solar panel 11 using, for example, the maximum power point tracking (MPPT) method.

The operations of the solar power converter 12 in steps S26 and S27 are continuously implemented until the generated power X does not exceed the threshold value α (No in step S21) or until the power storage amount B2 exceeds the threshold value β2 (Yes in step S22) and the power storage amount B1 exceeds the threshold value β1 (Yes in step S23).

The order of the processes of steps S22 and S26 may be reversed with the processes of steps S23 and S27.

FIG. 3 will be described. FIG. 3 is a flowchart showing a process procedure of control implemented by the controller 16 to the auxiliary power converter 14.

Step S31: Determination is made whether a power source of the vehicle is in a power source state where the vehicle can travel by an accelerator operation or in a power source state where the vehicle cannot travel. For example, the power source state of the vehicle that can travel by the accelerator operation is the "Ready-ON" state, and the power source state of the vehicle that cannot travel by the accelerator operation is a "Ready-OFF" state. When the power source of the vehicle is in the power source state where the vehicle cannot travel, the process proceeds to step S32. On the other hand, when the power source of the vehicle is in the power source state where the vehicle can travel, the process proceeds to step S35.

Step S32: Determination is made whether the power storage amount B1 of the auxiliary battery 13 is equal to or larger than a predetermined threshold value γ. The threshold value γ can be set to any value between the upper limit power storage amount and the lower limit power storage amount of the auxiliary battery 13. When the power storage amount B1 is equal to or larger than the threshold value γ, determination is made that the power of the auxiliary battery 13 can be exchanged and the process proceeds to step S33. On the other hand, when the power storage amount B1 is less than the threshold value γ, determination is made that the power of the auxiliary battery 13 cannot be exchanged and the process proceeds to step S34.

Step S33: The auxiliary power converter 14 is operated with the constant power output to supply the power from the auxiliary battery 13 to the driving battery 15. The power supply is performed as long as the power storage amount B1 of the auxiliary battery 13 exceeds a predetermined threshold value δ. The threshold value δ can be set to any value between the threshold value γ and the lower limit power storage amount of the auxiliary battery 13. When the power supply from the auxiliary battery 13 to the driving battery 15 ends, the process proceeds to step S31.

Step S34: The auxiliary power converter 14 is stopped. After the auxiliary power converter 14 is stopped, the process proceeds to step S31.

Step S35: Determination is made whether the power storage amount B1 of the auxiliary battery 13 exceeds a predetermined threshold value ε. For example, when the auxiliary battery 13 is further discharged, the threshold value ε can be set to the lower limit power storage amount that may affect the operation of the first load. When the power storage amount B1 exceeds the threshold value ε, determination is made that the operation of the first load is affected and the process proceeds to step S36. On the other hand, when the power storage amount B1 is equal to or less than the threshold value ε, determination is made that the operation of the first load is not affected and the process proceeds to step S37.

Step S36: The auxiliary power converter 14 is operated with the constant power output to start the power supply from the auxiliary battery 13 to the driving battery 15. In the above process, the auxiliary power converter 14 is operated with the constant power output for fully utilizing the power of the auxiliary battery 13, but may not be operated with constant voltage output depending on a situation. When the power supply from the auxiliary battery 13 to the driving battery 15 is started, the process returns to step S31.

Step S37: The auxiliary power converter 14 is operated with the constant voltage output to start the power supply from the driving battery 15 to the auxiliary battery 13. In the above process, the auxiliary power converter 14 is operated with the constant voltage output so as to respond an abrupt change in the movable first load, but may be operated with the constant power output depending to a situation. When the power supply from the driving battery 15 to the auxiliary battery 13 is started, the process returns to step S31.

Effects According to the Embodiment

With the solar power generation system 10 according to the one embodiment of the present disclosure described above, the generated power X of the solar panel 11 is not temporarily stored in the secondary battery dedicated for solar power generation as in the related art and directly supplied to the auxiliary battery 13. According to the above description, there is no need to include the secondary battery dedicated for solar power generation and the power converter dedicated for solar power generation that controls the power supply from the secondary battery dedicated for solar power generation to the auxiliary battery 13. Accordingly, the low cost and low weight of the solar power generation system 10 can be achieved.

With the solar power generation system 10 according to the embodiment, the auxiliary power converter 14 provided between the auxiliary battery 13 and the driving battery 15 can bidirectionally exchange the power. According to the above description, there is no need to include the power converter dedicated for solar power generation that controls the power supply from the secondary battery dedicated for solar power generation to the driving battery 15. Accordingly, the low cost and low weight of the solar power generation system 10 can be achieved.

Application Example

In the solar power generation system 10 according to the embodiment, the configuration can be easily changed such that power generated by another power generation device in addition to the power generated by the solar panel 11 can be used.

For example, a thermal power generation device that can generate power by heat of an exhaust device or the like and a power converter that can convert the power generated by the thermal power generation device into predetermined power and can output the converted power to the auxiliary battery 13 are added to the solar power generation system, and the power converter is connected to the auxiliary battery 13 in a chargeable and dischargeable manner. With the above configuration, both the generated power X of the solar panel 11 and the generated power of the thermal power generation device can be used.

The solar power generation system according to the embodiment of the present disclosure can be employed in the vehicle or the like which is desired to achieve the low cost and the low weight.

What is claimed is:

1. A solar power generation system of a vehicle, the solar power generation system comprising:
a solar panel configured to generate power by sunlight;
a first load;
an auxiliary battery configured to supply power to the first load;
a second load configured to drive the vehicle;
a driving battery configured to supply power to drive the vehicle to the second load;
a first power converter configured to supply the power generated by the solar panel to the auxiliary battery;
a second power converter configured to bidirectionally exchange power between the auxiliary battery and the driving battery; and
a processor programmed to:
only in a vehicle off state and when a power storage amount of the auxiliary battery is equal to or greater than a first threshold, instruct the second power converter to supply power of the auxiliary battery to the driving battery until the power storage amount of the auxiliary battery decreases to a lower limit value lower than the first threshold; and only in a vehicle on state:
when the power storage amount of the auxiliary battery is equal to or greater than a second threshold, instruct the second power converter to supply power of the auxiliary battery to the driving battery with constant power output; and
when the power storage amount of the auxiliary battery is less than the second threshold, instruct the second power converter to supply power of the driving battery to the auxiliary battery with constant voltage output.

2. The solar power generation system according to claim 1, wherein the processor is programmed to, in a vehicle on state, instruct the second power converter to supply power of the driving battery to the auxiliary battery when the power storage amount of the auxiliary battery is equal to or less than an upper limit value, and supply power of the auxiliary battery to the driving battery when the power storage amount of the auxiliary battery exceeds the upper limit value.

3. The solar power generation system according to claim 1, wherein the auxiliary battery is a lithium cell.

4. A method of controlling a solar power generation system of a vehicle, the solar power generation system comprising: a solar panel configured to generate power by sunlight; a first load; an auxiliary battery configured to supply power to the first load; a second load configured to drive the vehicle; a driving battery configured to supply power to drive the vehicle to the second load; a first power converter configured to supply the power generated by the solar panel to the auxiliary battery; a second power converter configured to bidirectionally exchange power between the auxiliary battery and the driving battery; and a processor, the method comprising performing the following steps using the processor:
only in a vehicle off state:
determining whether a power storage amount of the auxiliary battery exceeds a first threshold;
instructing the second power converter to supply power of the auxiliary battery to the driving battery when the power storage amount of the auxiliary battery exceeds the first threshold;
determining whether the power storage amount of the auxiliary battery decreases to a lower limit value lower than the first threshold; and
instructing the second power converter to stop supply of power of the auxiliary battery to the driving battery when the power storage amount of the auxiliary battery decreases to the lower limit value; and
only in a vehicle on state:
comparing the power storage amount of the auxiliary battery to a second threshold;
when the power storage amount of the auxiliary battery is equal to or greater than the second threshold, instructing the second power converter to supply power of the auxiliary battery to the driving battery with constant power output; and
when the power storage amount of the auxiliary battery is less than the second threshold, instructing the second power converter to supply power of the driving battery to the auxiliary battery with constant voltage output.

5. A non-transitory computer readable medium that embodies instructions that cause a processor to perform a method of controlling a solar power generation system of a vehicle, the solar power generation system comprising: a solar panel configured to generate power by sunlight; a first load; an auxiliary battery configured to supply power to the first load; a second load configured to drive the vehicle; a driving battery configured to supply power to drive the vehicle to the second load; a first power converter configured to supply the power generated by the solar panel to the auxiliary battery; a second power converter configured to bidirectionally exchange power between the auxiliary battery and the driving battery; and the processor, the method comprising performing the following steps using the processor:

only in a vehicle off state:
  determining whether a power storage amount of the auxiliary battery exceeds a first threshold;
  instructing the second power converter to supply power of the auxiliary battery to the driving battery when the power storage amount of the auxiliary battery exceeds the first threshold;
  determining whether the power storage amount of the auxiliary battery decreases to a lower limit value lower than the first threshold; and
  instructing the second power converter to stop supply of power of the auxiliary battery to the driving battery when the power storage amount of the auxiliary battery decreases to the lower limit value; and only in a vehicle on state:
  comparing the power storage amount of the auxiliary battery to a second threshold;
  when the power storage amount of the auxiliary battery is equal to or greater than the second threshold, instructing the second power converter to supply power of the auxiliary battery to the driving battery with constant power output; and
  when the power storage amount of the auxiliary battery is less than the second threshold, instructing the second power converter to supply power of the driving battery to the auxiliary battery with constant voltage output.

* * * * *